C. D. STEWART.
CABLE TESTER.
APPLICATION FILED JUNE 22, 1916.

1,254,288.

Patented Jan. 22, 1918.

Inventor
Christopher D. Stewart
by May U Zabel Atty.

UNITED STATES PATENT OFFICE.

CHRISTOPHER D. STEWART, OF OTTAWA, ILLINOIS, ASSIGNOR TO STEWART BROS., A PARTNERSHIP CONSISTING OF EDWARD S. STEWART AND CHRISTOPHER D. STEWART, OF OTTAWA, ILLINOIS.

CABLE-TESTER.

1,254,288.  Specification of Letters Patent.  Patented Jan. 22, 1918.

Application filed June 22, 1916. Serial No. 105,116.

*To all whom it may concern:*

Be it known that I, CHRISTOPHER D. STEWART, a citizen of the United States, residing at Ottawa, in the county of La Salle and State of Illinois, have invented a certain new and useful Improvement in Cable-Testers, of which the following is a full, clear, concise, and exact description, reference being had to the accompanying drawings, forming a part of this specification.

My invention relates to cable testers or similar devices, and more particularly to that character of device which is enabled to make certain locations and tests due to its ability to detect magnetic disturbances.

In the form in which I will explain my invention herein it is particularly constructed for use in locating troubles on cables having a plurality of independent circuits therein, and it is this specific form of the invention which I will use as a basis for description and illustration herein.

In this specific form of the invention the structure is such that the instrument itself can be rendered non-susceptible to certain magnetic disturbances which would render the proper location of a fault impossible, the construction however being such as to permit the detection of certain magnetic disturbances other than those eliminated. To be more specific it may be stated that if the instrument is to be used, for instance, to locate a cross between a pair of conductors in a cable, that the first step is the placing of a certain distinctive current upon the conductors which are at fault. This is usually known as a tone test. The conductors in a cable generally wind their way about the interior of the cable from one position to another thereof, never maintaining their exact relative positions for any considerable longitudinal distance of the cable. When placing the distinctive current upon the conductors it generally happens that due to leakage (frequently caused by the fault itself) the distinctive current finds its way to the lead cable sheath and from there to the messenger wire. The current which thus leaks to the cable sheath and messenger wire does not stop at the fault but continues on beyond the fault, thus making detection of the point of the fault very difficult and generally impossible. My instrument is particularly designed to render these leakage currents innocuous in the testing operation so that the device itself is susceptible only to the distinctive currents upon the faulty conductors themselves.

I will explain one form which my invention may take more in detail by referring to the accompanying drawing, in which—

Figure 1:
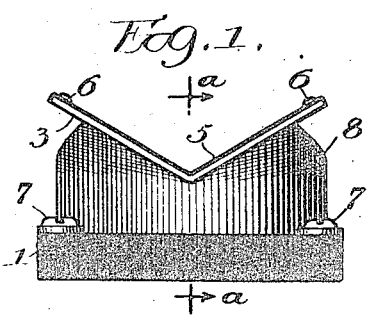
Figure 1 is an end view of a testing device constructed in accordance with my invention.
Figure 2:
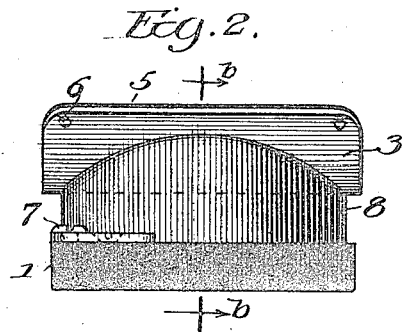
Fig. 2 is a side view thereof.
Figure 3:
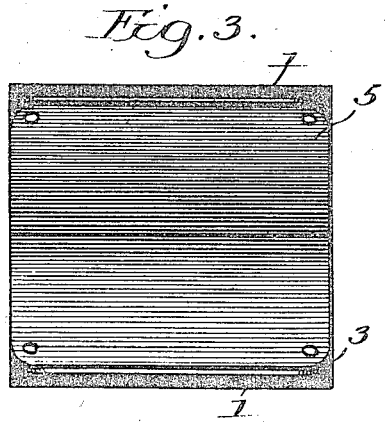
Fig. 3 is a top view thereof.
Figure 4:
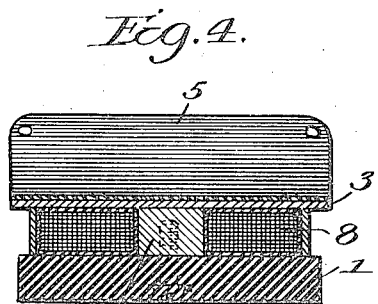
Fig. 4 is a sectional view on line *a—a* of Fig. 1.
Figure 5:
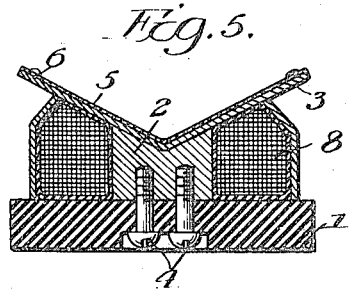
Fig. 5 is a sectional view on line *b—b* of Fig. 2.

My improved cable tester comprises the insulating base 1 into which is forced the centrally located iron pole piece 2. An angular guide plate and end piece 3 of non-magnetic material is mounted on the pole piece which pole piece is secured to the base 1 by means of the screws 4, 4. A facing of insulating material 5 is preferably riveted to the plate 3 by means of the rivets 6. Binding posts 7, 7 are mounted upon the base plate 1 and serve as terminals for the coil 8. A suitable receiver or other detector is to be connected to the binding posts 7, 7 so that should the exploring coil 8 be brought into a field of force which causes current to flow in said coil that the presence of these currents may be announced in the detector as customary. The coil 8 may preferably be wound upon a bobbin, if desired, and then placed about the pole piece 2, whereupon the coil may be suitably pressed into the peculiar form which it is shown to have by the illustrations. The coil is then symmetrical with respect to the center line of the device and the convolutions of the coil extend upwardly beyond the apex of the angular plate 3. In this manner a very symmetrical arrangement of the coil about the faulty conductor can be obtained.

Figure 6:
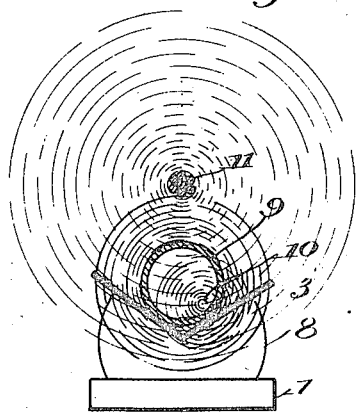
Fig. 6 is a diagrammatic view to illustrate the magnetic conductors.

It will also be seen that by reason of the construction of the device, as is more apparent from Fig. 6, that this symmetrical arrangement will hold true no matter what happens to be the size of the cable within reasonable limits. The device can be placed in symmetrical relation to cables of practical sizes, thus making the device practically universal in its application to standard sizes of cables, this construction of the device permitting its universal application being of course very important as is readily apparent to those skilled in the art.

Referring more particularly to Fig. 6, I have shown my improved device as applied to a cable illustrated herein merely by the sheath 9 and the faulty conductor 10. The cable sheath is supported from a messenger wire 11. Assume now that a current of distinctive character is placed upon the faulty conductor 10, then this distinctive current as a usual proposition leaks to the cable sheath 9 and to the messenger wire 11. If the conductor 10 is crossed with another conductor, then the distinctive current conditions should not be found in these conductors beyond the point of the fault and this is the theory on which testing of this character is undertaken. In practice, however, the leakage of the distinctive current to the cable sheath and the messenger wire carries this distinctive current beyond a fault. I have shown a field of force about the messenger wire 11, and I have shown a field of force about the cable sheath 9. I have likewise shown a field of force about the conductor 10. Now if the device is placed symmetrically with respect to the line joining the center points of the messenger wire and the cable, then the field of force due to the messenger wire and the field of force due to the cable sheath create no effect in the coil 8 as these fields act equally upon the opposite halves of said coil. The field of force due to the conductor 10 however is unsymmetrical with respect to the coil 8 and thus influences this coil. As before stated, it might happen that throughout a very short portion of its length the conductor may be found to be symmetrical with respect to the device when occupying the position illustrated in Fig. 6, but however due to the manner in which cables are made, such a position of the conductor would not extend throughout a very material portion of the cable. The conductor would soon lose its symmetrical position and the fault could be located to within the necessary limits for practical purposes.

It will thus be seen that by reason of the construction of my device it can be so placed as to be symmetrical with respect to cables of different sizes and thus render harmless those magnetic disturbances which it is not the object of the device to detect, but be in position to be influenced by and detect those disturbances which it is its purpose to locate.

From what has been described the nature of my invention will be readily clear to those skilled in the art, and it will also be apparent that modifications may be readily made within the scope of the appended claims without departing from the spirit of my said invention.

Having however thus described one form which my invention may take, what I claim as new and desire to secure by Letters Patent is:

1. In a device of the character described the combination with an exploring coil, of a flaring face plate for said coil, the apex of said flaring face plate extending inwardly of the outer portions of the upper convolutions of said coil, said face plate being symmetrical with respect to said coil and being adapted for adjustment against the cylindrical sheath of a cable whereby said coil is influenced only by a field of force unsymmetrical with respect to said sheath.

2. In a device of the character described the combination with an exploring coil, of a flaring non-magnetic face plate for said coil, said face plate being symmetrical with respect to said coil, and being adapted for adjustment against the cylindrical sheath of a cable whereby said coil is influenced only by a field of force unsymmetrical with respect to said sheath.

3. In a device of the character described the combination with an exploring coil, of a flaring non-magnetic face plate for said coil, the apex of said flaring face plate extending inwardly of the outer portions of the upper convolutions of said coil, said face plate being symmetrical with respect to said coil and being adapted for adjustment against the cylindrical sheath of a cable whereby said coil is influenced only by a field of force unsymmetrical with respect to said sheath.

4. In a device of the character described the combination with an exploring coil, of a flaring face plate for said coil, the apex of said flaring face plate extending inwardly of the outer portions of the upper convolutions of said coil, said face plate being symmetrical with respect to said coil and being adapted for adjustment against the cylindrical sheath of a cable whereby said coil is influenced only by a field of force unsymmetrical with respect to said sheath, and a magnetic core for said coil secured to said face plate.

5. In a device of the character described the combination with an exploring coil, of a flaring non-magnetic face plate for said coil, said face plate being symmetrical with respect to said coil and being adapted for adjustment against the cylindrical sheath of a cable whereby said coil is influenced only by a field of force unsymmetrical with respect to said sheath, and a magnetic core for said coil secured to said face plate.

6. In a device of the character described the combination with an exploring coil, of a flaring non-magnetic face plate for said coil, the apex of said flaring face plate extending inwardly of the outer portions of the upper convolutions of said coil, said face plate being unsymmetrical with respect to said coil and being adapted for adjustment against the cylindrical sheath of a cable whereby said coil is influenced only by a field of force unsymmetrical with respect to said sheath, and a magnetic core for said coil secured to said face plate.

In witness whereof, I hereunto subscribe my name this 1st day of June A. D. 1916.

CHRISTOPHER D. STEWART.